United States Patent
Lackey, Jr.

(10) Patent No.: US 11,481,216 B2
(45) Date of Patent: Oct. 25, 2022

(54) ATOMIC OPERATIONS IN A LARGE SCALE DISTRIBUTED COMPUTING NETWORK

(71) Applicant: Advanced Micro Devices, Inc., Santa Clara, CA (US)

(72) Inventor: Stanley Ames Lackey, Jr., Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 406 days.

(21) Appl. No.: 16/126,504

(22) Filed: Sep. 10, 2018

(65) Prior Publication Data

US 2020/0081712 A1    Mar. 12, 2020

(51) Int. Cl.

| | |
|---|---|
| *G06F 9/52* | (2006.01) |
| *G06F 9/30* | (2018.01) |
| *G06F 9/54* | (2006.01) |
| *G06F 9/46* | (2006.01) |
| *G06F 9/50* | (2006.01) |

(52) U.S. Cl.
CPC ...... *G06F 9/30087* (2013.01); *G06F 9/30101* (2013.01); *G06F 9/467* (2013.01); *G06F 9/5072* (2013.01); *G06F 9/526* (2013.01); *G06F 9/54* (2013.01); *G06F 9/541* (2013.01)

(58) Field of Classification Search
CPC .................................. G06F 9/526; G06F 9/541
See application file for complete search history.

(56) References Cited

U.S. PATENT DOCUMENTS

| | | | | |
|---|---|---|---|---|
| 6,112,019 | A * | 8/2000 | Chamdani | G06F 9/3836 712/214 |
| 6,792,599 | B2 * | 9/2004 | Poulsen | G06F 8/45 717/136 |
| 2004/0168032 | A1 * | 8/2004 | Lee | G06F 11/1666 711/141 |
| 2009/0271513 | A1 * | 10/2009 | Liu | H04L 45/00 709/224 |
| 2011/0289510 | A1 * | 11/2011 | Lin | G06F 9/3004 718/106 |

(Continued)

OTHER PUBLICATIONS

Tanenbaum, Andrew S. "Structured Computer Organization" Prentice-Hall, Inc. Second edition. (Year: 1984).*

*Primary Examiner* — Jacob Petranek
(74) *Attorney, Agent, or Firm* — Volpe Koenig

(57) ABSTRACT

Techniques for executing an atomic command in a distributed computing network are provided. A core cluster, including a plurality of processing cores that do not natively issue atomic commands to the distributed computing network, is coupled to a translation unit. To issue an atomic command, a core requests a location in the translation unit to write an opcode and operands for the atomic command. The translation unit identifies a location (a "window") that is not in use by another atomic command and indicates the location to the processing core. The processing core writes the opcode and operands into the window and indicates to the translation unit that the atomic command is ready. The translation generates an atomic command and issues the command to the distributed computing network for execution. After execution, the distributed computing network provides a response to the translation unit, which provides that response to the core.

20 Claims, 4 Drawing Sheets

(56) References Cited

U.S. PATENT DOCUMENTS

| | | | |
|---|---|---|---|
| 2015/0178086 A1* | 6/2015 | Hughes | G06F 9/3806 |
| | | | 711/125 |
| 2017/0235557 A1* | 8/2017 | Dang | G06F 9/4552 |
| | | | 717/153 |
| 2018/0004687 A1* | 1/2018 | Guim Bernat | H04L 67/10 |
| 2019/0179783 A1* | 6/2019 | Laughton | G06F 13/4022 |

* cited by examiner

ATOMIC OPERATIONS IN A LARGE SCALE DISTRIBUTED COMPUTING NETWORK

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Large scale multiprocessor networks such as those described in specifications published by the GenZ Consortium are becoming increasingly popular. GenZ networks connect devices through a switched fabric that uses memory access semantics. Devices communicate with each other in a similar manner as with their own local memory, by issuing reads and writes. More complex forms of communication, such as atomic operations, are possible as well. Improvements to such large scale computing networks are constantly being made.

BRIEF DESCRIPTION OF THE DRAWINGS

A more detailed understanding may be had from the following description, given by way of example in conjunction with the accompanying drawings wherein.

DETAILED DESCRIPTION

Techniques for executing an atomic command in a distributed computing network are provided. A core cluster, including a plurality of off-the-shelf components that are not natively able to issue atomic commands to the distributed computing network, is coupled to a translation unit that is able to convert commands from processing cores of the core cluster into a format that is recognized by the distributed computing network. To issue an atomic command, a core requests a location in the translation unit to write an opcode and operands for the atomic command. The translation unit identifies a location (a "window") that is not in use by another atomic command and indicates the location to the processing core. The processing core then writes the opcode and operands into the window and indicates to the translation unit that the atomic command is ready. The translation generates an atomic command and issues the command to the distributed computing network for execution. After execution, the distributed computing network provides a response to the translation unit, which provides that response to the core.

Figure 1:
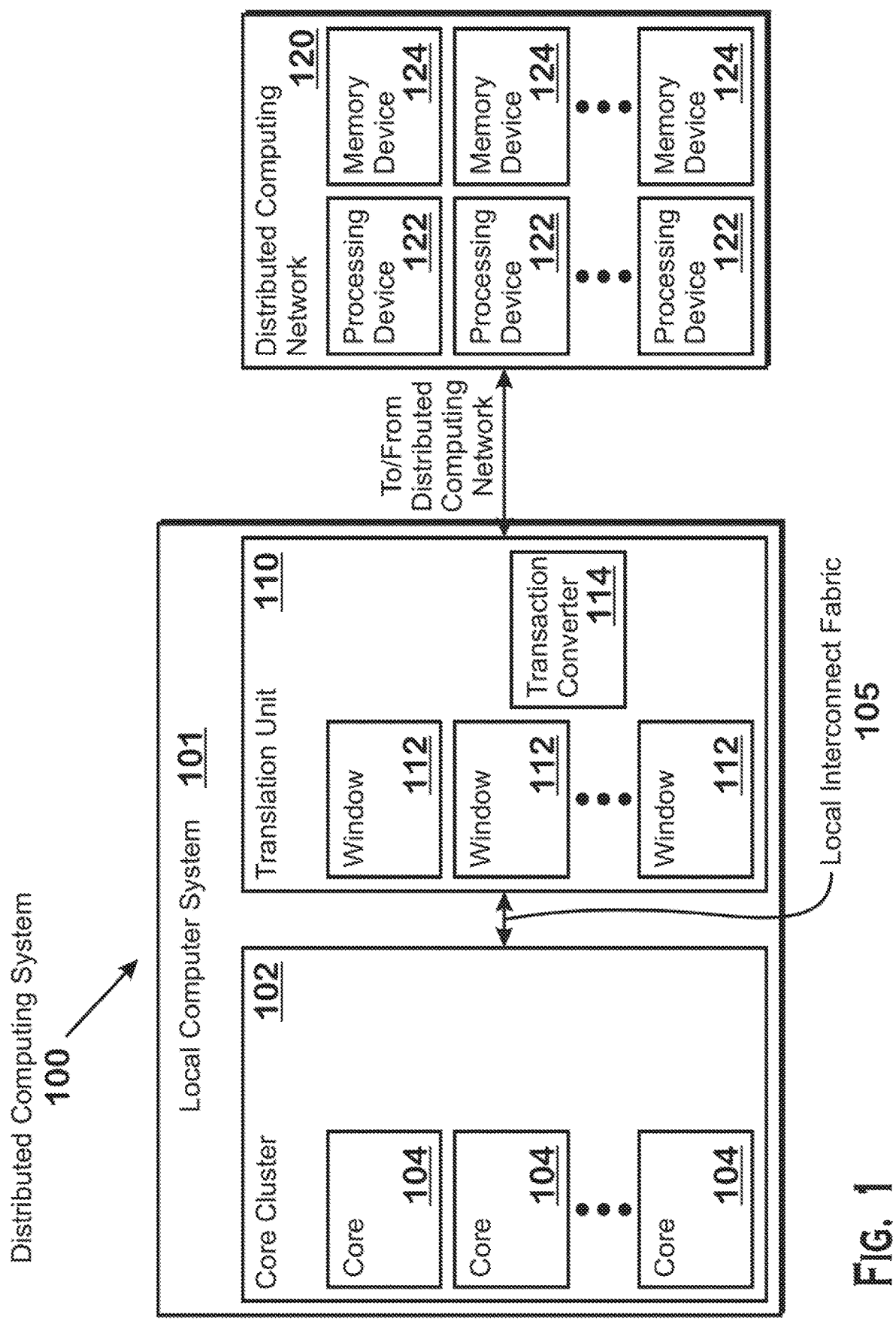
FIG. 1 is a block diagram of a distributed computing system, according to an example.

FIG. 1 is a block diagram of a distributed computing system 100, according to an example. The distributed computing system 100 includes a distributed computing network 120 and a local computer system 101. The distributed computing network 120 is a distributed network of processing devices 122 and memory devices 124. The processing devices 122 are any type of device that can process data and communicate across the distributed computing network 120. The memory devices 124 are any type of device that store data for access by other devices of the distributed computing network 120. In general, the distributed computing network 120 allows sending and receiving commands and data to particular processing devices 122 and/or memory devices 124 by writing to particular memory addresses in an address space that is common to the distributed computing network 120. In some implementations, the distributed computing network 120 is a network that complies with one or more standards of the GenZ Consortium.

The local computer system 101 is coupled to and thus considered a part of the distributed computing network 120 although for purposes of discussion, the local computer system 101 is shown separately from the distributed computing network 120. The local computer system 101 includes a core cluster 102 including one or more computing cores 104 and a translation unit 110. In order to communicate with other devices on the distributed computing network 120, transactions must be made according to a specific format. However, the cores 104 of the core cluster 102 are not natively able to communicate via the format of the distributed computing network 120, where "natively" means that hardware is able to generate commands in that format and the parse data received in that format, without being specifically configured to do so with software. An example of a reason for why the computing cores 104 are not natively able to communicate in the format of the distributed computing network 120 is that the computing cores 104 are "off-the-shelf" processing components not specifically designed to interface with the distributed computing network 120. A command format includes the opcode identification bytes and the placement and size of operands within the command.

The translation unit 110 of the local computer system 101 translates memory access transactions generated by the computing cores 104 into the format appropriate for the distributed computing network 120. The processing cores 104 generate memory access commands in a particular format and specifying a local address space (i.e., an address space local to the local computer system 101). The translation unit 110 modifies the format of those commands to a format appropriate for the distributed computing network 120 and transmits the modified commands to the distributed computing network 120 for handling. In response to the distributed computing network 120 processing the command and sending a response to the command back to the translation unit, the translation unit 110 translates the response back to the format appropriate for the processing cores 104 and transmits the translated response back to the processing cores 104. In various implementations, translating between the format of the processing cores 104 and the format of the distributed computing network 120 is performed by the transaction converter 114.

When not used in conjunction with the distributed computing network 120 (i.e., in a fully local computing system), the processing cores 104 directly generate simple commands such as read and write commands for local memory without requiring translation by the translation unit 110. Atomic operations are more complex memory access commands and require some additional steps. Specifically, to execute an atomic operation, a processing core 104 would lock a particular data item in memory, modify that data, and then release the lock.

The simple read and write commands generated by a processing core 104 can be directly translated by the translation unit 110 into a format used by the distributed computing network 120. However, the model by which a processor core 104 executes atomic instructions locally is not conducive to the distributed computing network 120. Specifically, the sequence of locking a memory address, then performing one or more operations, and then unlocking the memory address, would, if directly controlled by the local computing system 101, result in high latency due to the transactions occurring over a computer network.

Therefore, instead of directly controlling atomic memory operations in the distributed computing network 120, in response to a processing core 104 making a request to perform an atomic memory operation in the distributed computing network 120, the translation unit 110 generates an atomic memory access command and transmits that command to the distributed computing network 120 for execution. The distributed computing network 120 executes that atomic memory access command and generates a response value. When the distributed computing network 120 provides the response value for the atomic memory access command to the translation unit 110, the translation unit 110 provides that response value to the processing core 104.

It should be emphasized that there is a distinction between the manner in which simple (i.e., non-atomic) reads and writes are generated by a processing core 104 and issued to the translation unit 110 and the manner in which the processing core 104 generates and transmits atomic commands to the translation unit 110. Specifically, read and write commands are generated natively by the processor cores 104 and emitted over the local interconnect fabric 105. The translation unit 110 then translates these natively generated commands into a format recognized by the distributed computing network 120 and transmits those commands to the distributed computing network 120, which then executes those commands. For atomic memory access commands, however, the processing cores 104 are not able to simply generate native atomic memory access commands in a similar manner. This inability is because, as described above, the processing cores 104 control atomic command execution on a more granular level (e.g., request a lock to a memory address, modify contents at the memory address, and release the lock) which is not feasible for operation in the distributed computing network 120.

Figure 2:
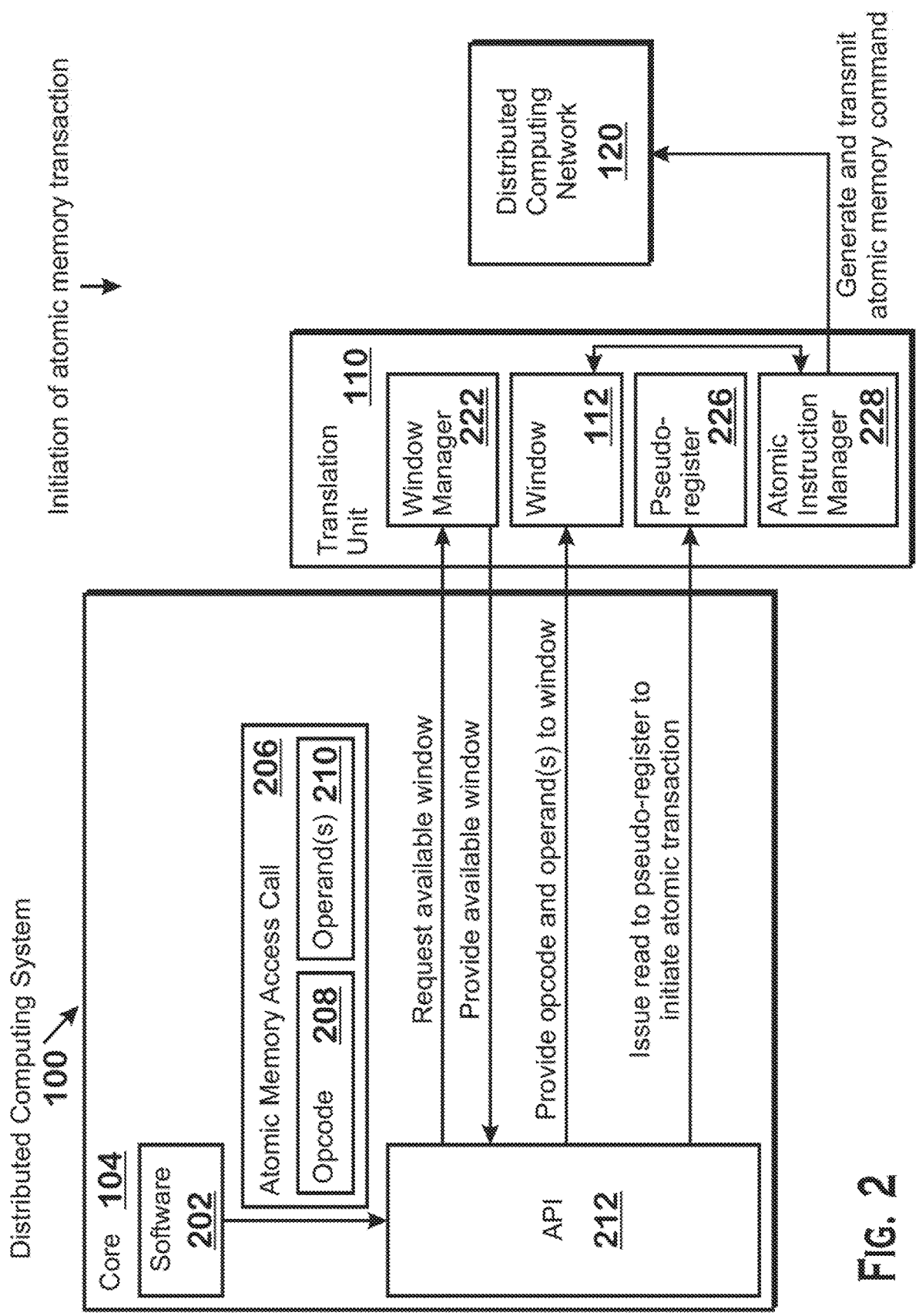
FIG. 2 is a block diagram of the distributed computing system, illustrating aspects of issuing an atomic memory transaction to the distributed computing network, according to an example.
Figure 3:
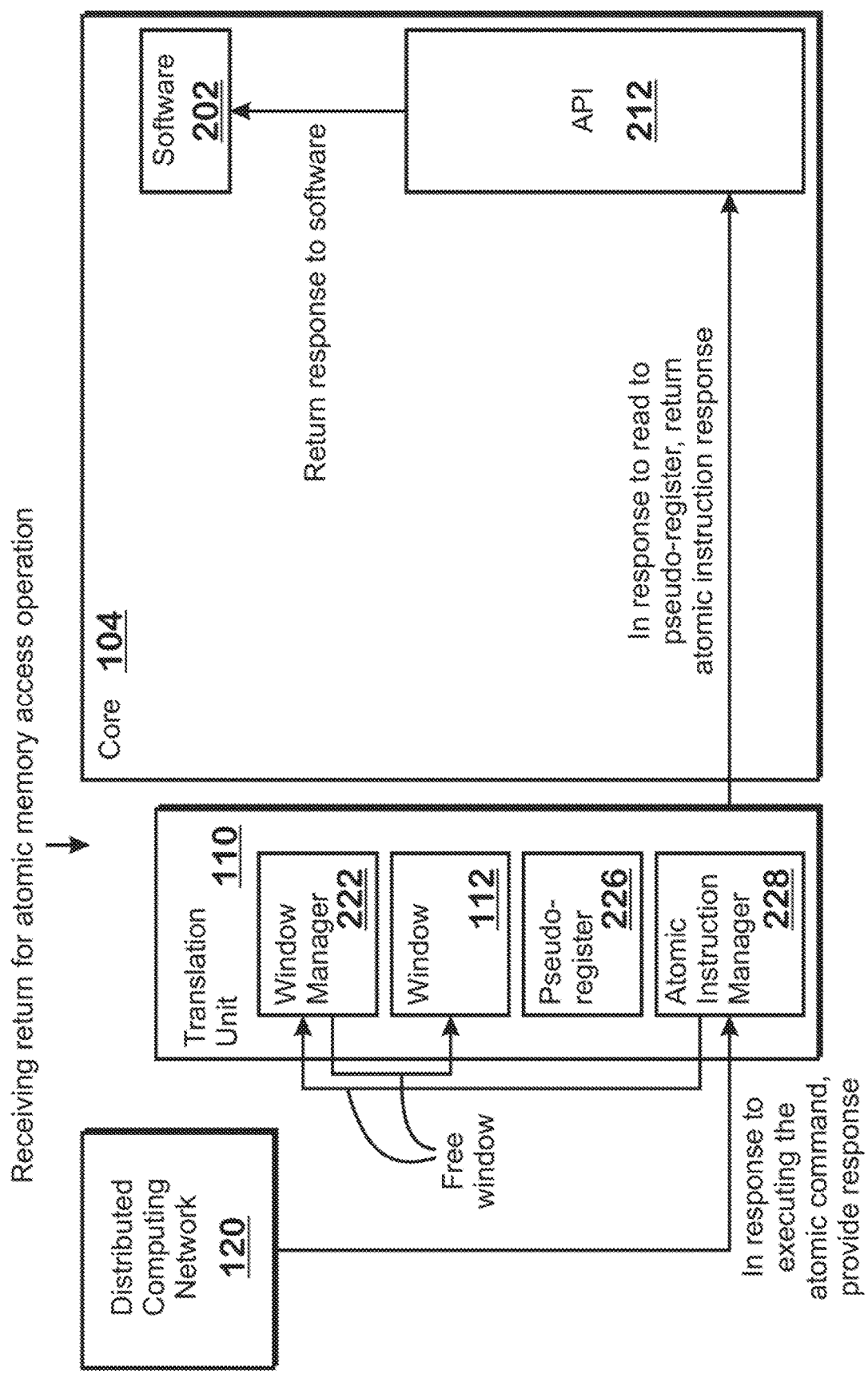
FIG. 3 is a block diagram illustrating aspects of the distributed computing system related to receiving the response for an executed atomic command and returning that response to the software that requested the atomic command be issued, according to an example.
Figure 4:
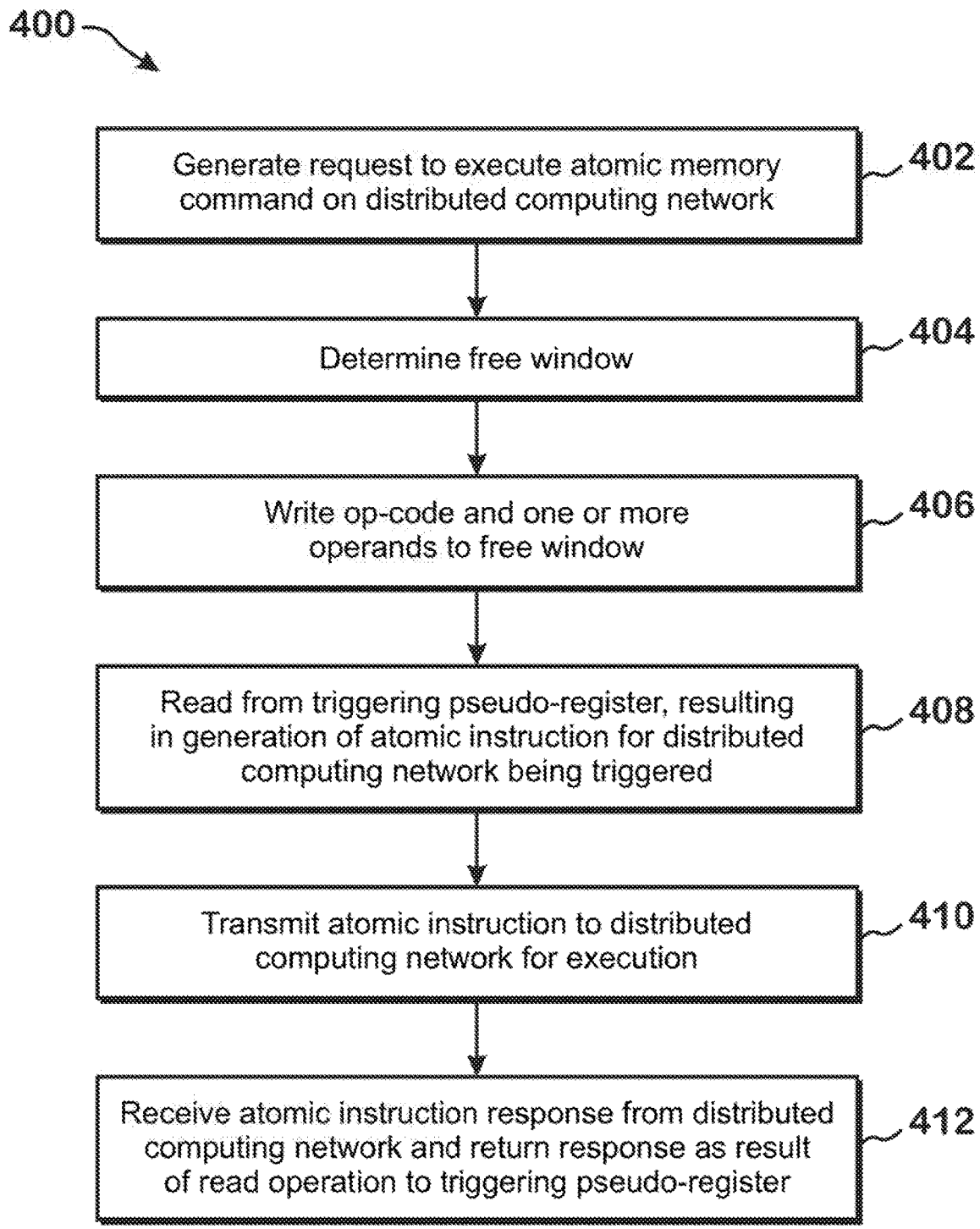
FIG. 4 is a flow diagram of a method for generating an atomic memory access command, according to an example.

For this reason, the translation unit 110 provides special functionality for executing atomic instructions on the distributed computing network 120. Specifically, the translation unit 110 provides a series of atomic command windows 112 for the different processing cores 104 to "build" atomic commands, where "build" means assemble the various components (such as operation codes ("op-codes") and operands) into the window 112. Each window 112 is an independent portion of memory of the translation unit 110 available to be written to or read from by a client. When an atomic command is "built" (all components of the atomic command are placed in a window 112), and the processing core 104 signals to the translation unit 110 that the atomic command is ready, the translation unit 110 generates atomic commands in the format appropriate for the distributed computing network 120, based on the atomic command. The translation unit 110 then issues the translated atomic command to the distributed computing network 120 for execution. Upon being executed, the distributed computing network 120 provides a response to the translation unit 110, which provides that response to the software 202. FIGS. 2-4 provide details regarding generation and issuance of atomic commands. Specifically, FIGS. 2 and 3 illustrate details of the distributed computing system 100 related to issuing atomic commands (FIG. 2) and receiving responses to the atomic commands (FIG. 3) and FIG. 4 is a flow diagram of a method for issuing atomic commands and receiving responses to the atomic commands.

FIG. 2 is a block diagram of the distributed computing system 100, illustrating aspects of issuing an atomic memory transaction 200 to the distributed computing network 120, according to an example. The portion of the distributed computing system 100 shown includes a processing core 104, the translation unit 110, and the distributed computing network 120, though it should be understood that other portions of the distributed computing system 100 not illustrated in FIG. 2 are nonetheless included as well.

The processing core 104 includes a software module 202 that issues atomic memory access calls 206 to an application programming interface ("API") 212. In various examples, the software module 202 is a user-level application program, a portion of an operating system, a device driver, or any other software that can execute on the processing core 104. The atomic memory access call 206 includes an opcode 208 and one or more operands 210. The opcode 208 specifies the exact atomic command for execution and the operand(s) 210 specify one or more parameters to be consumed by the atomic command. In an example, the operand(s) 210 specify the memory address that is the target of the atomic command, as well as values to use to modify the value at the specified memory address.

The API 212 includes a binary library that is included within the software 202 or is separate (such as with a dynamically linked library). The API 212 converts the atomic memory access call 206 into operations to be performed by the translation unit 110. The operations generated based on the atomic memory access call 206 are illustrated between the API 212 and the translation unit 110.

The translation unit 110 includes a window manager 222, which identifies and keeps track of which windows 112 are free and which are occupied, a plurality of windows 112 for storing atomic memory command information as described herein, a pseudo-register 226, which acts as a mechanism to trigger generation of an atomic command for the distributed computing network 120 based on the contents of a window 112, and an atomic instruction manager 228, which generates the atomic commands for execution by the distributed computing network 120 based on the contents of a window 112, keeps track of in-flight atomic commands, receives responses from the distributed computing network 120 when atomic commands are completed, and returns those responses to the processor core 104 that requested the atomic command be executed. The atomic instruction manager 228 also instructs the window manager 222 to free the window 112 when the atomic command has been completed and the response is en route to the processing core 104. Although various components of the translation unit 110 are shown as distinct components, it should be understood that any unit (hardware, software, or a combination thereof) that performs the functions described herein for the components of the translation unit 110, however configured, falls within the scope of the present disclosure.

As described above, software 202 executes an atomic memory access call 206 using the API 212. In response to the software 202 requesting performance of the atomic memory access call 206, the API 212 performs the following. The API 212 requests an available window 112 from the translation unit 110. The translation unit 110 determines an available window (i.e., a window that is not in use for a different in-flight atomic memory command, e.g., by a different processing core 104 or a different thread within the processing core 104 illustrated in FIG. 2). The translation unit 110 indicates the available window to the API 212. The API 212 writes the opcodes and operands specified in the atomic memory access call 206 into the window 112 specified. The API 212 issues a read operation to a "pseudo-register," which causes the translation unit 110 to generate and issue an atomic command for execution by the distributed computing network 120. The "pseudo-register" 226 is a memory address assigned to the translation unit 110 that "appears" to software in the processing core 104 as a real register. However, unlike a real register, the pseudo-register 226 does not store any data. Instead, issuing a read operation to the address of the pseudo-register 226 causes the atomic instruction manager 228 to generate an atomic instruction in the format of the distributed computing network 120 based on the contents of the window 112. Later in the transaction, when the distributed computing network 120 has provided a response to the atomic memory command, the translation unit 110 responds to the "read" to the pseudo-register 226 with that response, thus allowing the processing core 104 to complete its read operation (though in an unconventional manner). Note, the atomic instruction manager 228 may be a part of transaction converter 114 illustrated in FIG. 1.

Once issued by the translation unit 110, the atomic memory command is routed to the destination (e.g., a particular address in a memory device 124) in the distributed computing network 120. The destination executes that command and provides a response to the translation unit 110.

FIG. 3 is a block diagram illustrating aspects of the distributed computing system 100 related to receiving the response for an executed atomic command and returning that response to the software 202 that requested the atomic command be issued, according to an example. In response to executing the atomic command, the distributed computing network 120 provides a response to that command. The specific response provided may vary and is specified by the opcode 208 of the atomic command. In an example, the atomic command is a command to atomically add a value to a value stored at a particular memory address and to return the value that was previously at that address. For example, if the value 4 were stored at a particular address and the atomic command atomically adds 1 to that value, then the value stored at the address would become 5 and the response for the address would be 4.

In response to receiving the atomic command response, the atomic instruction manager 228 of the translation unit 110 transmits the response to the processing core 104. The response may be presented to the API 212, which returns the response (e.g., via a callback, by writing the response to a memory location associated with the software 202, or through any technically feasible means) to the software 202 that originally requested execution of the atomic command. The atomic instruction manager 228 also instructs the window manager 222 to free the window 112 used for the atomic command so that the window can be used for a different atomic command. In some implementations, the atomic instruction manager 228 instructs the window manager 222 to free the window 112 when the atomic command is first generated for and transmitted to the distributed computing network 120, and not as late as when the response to the atomic command is received at the translation unit 110.

FIG. 4 is a flow diagram of a method 400 for generating an atomic memory access command, according to an example. Although described with respect to the system of FIGS. 1-3, it should be understood that the method 400 can be performed by any system and the steps of the method 400 can be performed in any technically feasible order.

The method 400 begins at step 402, where the software 202 (e.g., using API 212) generates a request to execute an atomic memory command. An example of such a request is illustrated in FIG. 2 (as atomic memory access call 206). At step 404, the software 202 (again, for example, using API 212) determines a free window 112 within a translation unit 110. As described above, this determination is made by requesting a free window from the translation unit 110 which then identifies a free window and provides a pointer to that free window back to the software 202. A window 112 is "free" if the window 112 is not in use for a different atomic memory access command.

At step 406, software 202 (again, for example, using API 212) writes an op-code and one or more operands into the free window. The op-code specifies the atomic memory command that is to be executed on the distributed computing network 120 and the operands are parameters to be consumed by that atomic memory command. At step 408, software 202 reads from a triggering pseudo-register 226. The pseudo-register is associated with the window 112 of steps 404-406. Reading from the triggering pseudo-register 226 causes the translation unit 110 to convert the contents of the window 112 into an atomic memory command of the format appropriate for the distributed computing network 120 and to issue that command over the distributed computing network at step 410.

The distributed computing network 120 processes the atomic memory command and provides a response to that command to the translation unit 110. The translation unit 110 returns that response to software 202 as a response to the read request that occurred for the pseudo-register 226.

It should be understood that the method 400 can be performed concurrently for multiple different in flight atomic memory commands being issued concurrently by different processing cores 104. The existence of multiple windows 112, along with the existence of the window manager 222 which determines which windows 112 are free when new an atomic command is built, facilitates this concurrent execution of the different atomic commands concurrently.

The techniques herein allow off-the-shelf processing components to be used with a distributed computing network where the off-the-shelf processing components do not have native support for generating and issuing atomic memory commands on the distributed computing network. These techniques thus allow for adding processing resources to such a distributed computing network without requiring customized processing resources, which allows distributed computing networks to be built at a lower cost than if such customized processing resources were required.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for requesting execution of an atomic memory command by a distributed computing network at the request of a processing core, the method comprising:
   obtaining a free window of a translation unit, the free window comprising a portion of memory of the translation unit;
   writing an opcode and one or more operands for the atomic memory command into the window;
   requesting the translation unit to generate the atomic memory command based on contents of the window; and
   generating the atomic memory command from the contents of the window, the atomic memory command being in a format appropriate for the distributed computing network.

2. The method of claim 1, wherein obtaining the free window, writing the opcode, and requesting the translation unit to generate the atomic memory command are performed by an application programming interface.

3. The method of claim 1, wherein obtaining the free window comprises:
   requesting the free window from the translation unit and receiving the free window in response.

4. The method of claim 1, wherein:
   the obtaining the free window, writing the opcode, and requesting the translation unit to generate the atomic memory command are performed by a first processing core of a core cluster; and
   the generating the atomic command is performed by the translation unit.

5. The method of claim 4, further comprising:
   requesting execution of a second atomic memory command by the distributed computing network, the requesting performed by a second processing core different than the first processing core, the requesting being performed concurrently with use of the window by the first processing core.

6. The method of claim 1, further comprising:
   receiving a response for the atomic memory command.

7. The method of claim 6, wherein:
   requesting the translation unit to generate the atomic memory command comprises issuing a read to a pseudo-register of the translation unit.

8. The method of claim 7, further comprising:
   forwarding the response for the atomic memory command to the processing core as a response to the read to the pseudo-register of the translation unit.

9. The method of claim 1, further comprising:
   releasing the window in response to generating and issuing the memory command.

10. A system for executing an atomic memory command by a distributed computing network at the request of a processing core, the system comprising:
    a processing core; and
    a translation unit,
    wherein the processing core is configured to:
       obtain a free window of a translation unit, the free window comprising a portion of memory of the translation unit;
       write an opcode and one or more operands for the atomic memory command into the window; and
       request the translation unit to generate the atomic memory command based on contents of the window, and
    wherein the translation unit is configured to:
       generate the atomic memory command from the contents of the window, the atomic memory command being in a format appropriate for the distributed computing network.

11. The system of claim 10, wherein obtaining the free window, writing the opcode, and requesting the translation unit to generate the atomic memory command are performed by an application programming interface executed on the processing core.

12. The system of claim 10, wherein the processing core is configured to obtain the free window by:
    requesting the free window from the translation unit and receiving the free window in response.

13. The system of claim 10, further comprising:
    a second processing core, configured to request execution of a second atomic memory command by the distributed computing network, the requesting being performed concurrently with use of the window by the first processing core.

14. The system of claim 10, wherein the translation unit is configured to transmit a response for the atomic memory command to the processing core.

15. The system of claim 14, wherein the processing core is configured to request the translation unit to generate the atomic memory command by issuing a read to a pseudo-register of the translation unit.

16. The system of claim 15, wherein the translation unit is configured to transmit the response for the atomic memory command to the processing core as a response to the read to the pseudo-register of the translation unit.

17. The system of claim 10, wherein the translation unit is further configured to release the window in response to generating and issuing the memory command.

18. A non-transitory computer-readable medium storing instructions for executing an atomic memory command by a distributed computing network at the request of a processor core, wherein the instruction, when executed by a processor core, cause the processor core to:
    obtain a free window of a translation unit, the free window comprising a portion of memory of the translation unit;
    write an opcode and one or more operands for the atomic memory command into the free window; and
    request the translation unit to generate the atomic memory command based on contents of the window;

wherein requesting the translation unit generate the atomic memory command causes the translation unit to generate the atomic memory command from the contents of the window, the atomic memory command being in a format appropriate for the distributed computing network.

19. The non-transitory computer-readable medium of claim 18, wherein obtaining the free window comprises: requesting the free window from the translation unit and receiving the free window in response.

20. The non-transitory computer-readable medium of claim 18, wherein the instructions are further configured to cause the translation unit to release the window in response to generating and issuing the memory command.

\* \* \* \* \*